(12) United States Patent
Yamato et al.

(10) Patent No.: US 11,539,312 B2
(45) Date of Patent: Dec. 27, 2022

(54) MOTOR DRIVER AND MOTOR DRIVING SYSTEM

(71) Applicant: ROHM CO., LTD., Kyoto (JP)

(72) Inventors: Tetsuo Yamato, Kyoto (JP); Noboru Takizawa, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 153 days.

(21) Appl. No.: 16/943,669

(22) Filed: Jul. 30, 2020

(65) Prior Publication Data
US 2021/0044222 A1 Feb. 11, 2021

(30) Foreign Application Priority Data

Aug. 9, 2019 (JP) .............................. JP2019-147936

(51) Int. Cl.
| | | |
|---|---|---|
| *H02P 3/12* | (2006.01) | |
| *B60S 1/08* | (2006.01) | |
| *B60N 2/02* | (2006.01) | |
| *B60J 1/12* | (2006.01) | |

(52) U.S. Cl.
CPC .................. *H02P 3/12* (2013.01); *B60J 1/12* (2013.01); *B60N 2/0232* (2013.01); *B60S 1/08* (2013.01)

(58) Field of Classification Search
CPC .. H02P 3/12; B60J 1/12; B60N 2/0232; B60S 1/08
See application file for complete search history.

(56) References Cited

U.S. PATENT DOCUMENTS

| | | | | |
|---|---|---|---|---|
| 2004/0217724 | A1* | 11/2004 | Nagasawa | H02P 7/04 318/280 |
| 2014/0117751 | A1* | 5/2014 | Gillberg | F02D 41/20 307/9.1 |
| 2014/0176033 | A1* | 6/2014 | Heo | H03K 17/162 318/400.42 |
| 2020/0028452 | A1* | 1/2020 | Alcorn | H02P 6/24 |

FOREIGN PATENT DOCUMENTS

JP 2015056913 3/2015

\* cited by examiner

*Primary Examiner* — Zoheb S Imtiaz
(74) *Attorney, Agent, or Firm* — Fish & Richardson P.C.

(57) ABSTRACT

The present invention provides a motor driver and a motor driving system capable of suppressing power consumption when a motor is in a brake state. The motor driver of the present invention includes: a half-bridge power output section, including a high-side transistor and a low-side transistor; a high-side driving circuit, driving the high-side transistor; and a control portion. When switching to a brake mode, the low-side transistor is turned on and the control portion turns off the high-side driving circuit.

19 Claims, 11 Drawing Sheets

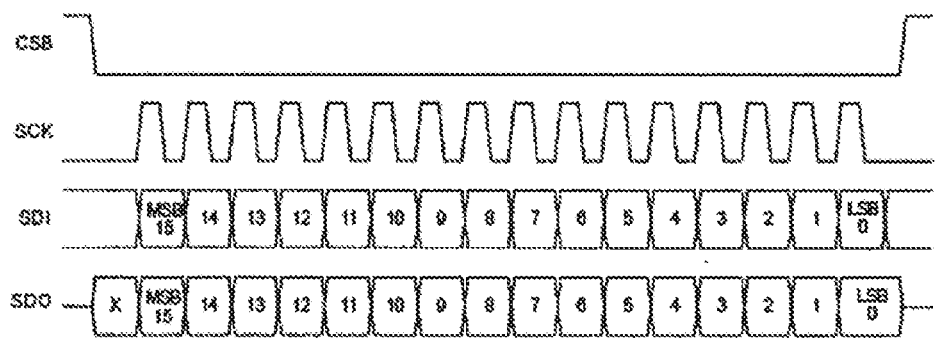

FIG.3

| Bit number | Name | Description | Bit status |
|---|---|---|---|
| 15 | SRR | Status reset register (Bit is to be auto-cleared) | 0: Normal<br>1: Reset |
| 14 | HSC1 | Control high side 1 | 0: High side turned off<br>1: High side turned on |
| 13 | LSC1 | Control low side 1 | 0: Low side turned off<br>1: Low side turned on |
| 12 | HSC2 | Control high side 2 | 0: High side turned off<br>1: High side turned on |
| 11 | LSC2 | Control low side 2 | 0: Low side turned off<br>1: Low side turned on |
| 10 | HSC3 | Control high side 3 | 0: High side turned off<br>1: High side turned on |
| 9 | LSC3 | Control low side 3 | 0: Low side turned off<br>1: Low side turned on |
| 8 | - | Not used | - |
| 7 | - | Not used | - |
| 6 | - | Not used | - |
| 5 | - | Not used | - |
| 4 | - | Not used | - |
| 3 | UNDER LOAD | Mode of low load register | 0: Turned on<br>1: Turned off |
| 2 | TSDSTH | Mode of thermal shutdown register | 0: Locked<br>1: Pass |
| 1 | PSSTH | Mode of over voltage protection/reduced voltage protection register | 0: Locked<br>1: Pass |
| 0 | RESERVE | RESERVE | 0: Usual<br>1: Not allowed |

FIG.4

| Bit number | Name | Description | Bit status |
|---|---|---|---|
| 15 | OCDS | Status of overcurrent detection | 0: Normal<br>1: Malfunction |
| 14 | HSS1 | Status of high side 1 | 0: High side turned off<br>1: High side turned on |
| 13 | LSS1 | Status of low side 1 | 0: Low side turned off<br>1: Low side turned on |
| 12 | HSS2 | Status of high side 2 | 0: High side turned off<br>1: High side turned on |
| 11 | LSS2 | Status of low side 2 | 0: Low side turned off<br>1: Low side turned on |
| 10 | HSS3 | Status of high side 3 | 0: High side turned off<br>1: High side turned on |
| 9 | LSS3 | Status of low side 3 | 0: Low side turned off<br>1: Low side turned on |
| 8 | - | Not used | - |
| 7 | - | Not used | - |
| 6 | - | Not used | - |
| 5 | - | Not used | - |
| 4 | - | Not used | - |
| 3 | UNDER LOADS | Status of low load | 0: Normal<br>1: Malfunction |
| 2 | TSDS | Status of overheat shutdown | 0: Normal<br>1: Malfunction |
| 1 | OVPS | Status of over voltage protection | 0: Normal<br>1: Malfunction |
| 0 | UVLOS | Status of reduced voltage protection (VS) | 0: Normal<br>1: Malfunction |

FIG.5

MOTOR DRIVER AND MOTOR DRIVING SYSTEM

BACKGROUND OF THE INVENTION

Field of the Invention

The present invention relates to a motor driver.

Description of the Prior Art

Conventionally, quite a number of motor drivers for driving DC (direct current) brush motors are built in with semiconductor integrated circuit devices. Such type of semiconductor integrated circuit device is built in with a motor driver. The motor driver sets a so-called half-bridge power output section including a high-side transistor and a low-side transistor as one channel, and accordingly includes half-bridge power output sections of multiple channels (for example, refer to patent document 1).

PRIOR ART DOCUMENT

Patent Publication

[Patent document 1] Japan Patent Publication No. 2015-56913

SUMMARY OF THE INVENTION

Problems to be Solved by the Invention

In the foregoing motor driver, a motor (DC brushless motor) is connected between output terminals of half-bridge power output sections equivalent to two channels. Furthermore, when the motor is stopped, control of setting the outputs of the output terminals to a ground potential is needed, that is, so-called short brake needs to be performed.

However, in short brake, a motor driver is conventionally in an active state and generates consumption of electric current. Particularly, when a motor driver is applied for, for example, an in-vehicle use, the time of a halt state of a motor used for a power window and a power seat while the vehicle is in operation is relatively long.

In view of the foregoing situation, it is an object of the present invention to provide a motor driver capable of suppressing power consumption in a brake state of a motor.

Technical Means for Solving the Problem

According to an embodiment of the present invention, a motor driver includes: a half-bridge power output section, including a high-side transistor and a low-side transistor; a high-side driving circuit, driving the high-side transistor; and a control portion. The motor driver is configured such that, when switching to a brake mode, the low-side transistor is turned on, and the control portion turns off the high-side driving circuit (first configuration).

Moreover, the first configuration may further include a low-side driving circuit driving the low-side transistor, and the control portion, when switching to the brake mode, may control the low-side driving circuit in an operating state to turn on the low-side transistor (second configuration).

Moreover, in the second configuration, the control portion may receive an instruction by serial communication for switching to the brake mode (third configuration).

Moreover, the second configuration may further include a dedicated external terminal receiving a brake signal from the exterior, that is, a brake terminal, and the control portion switches to the brake mode based on the brake signal inputted through the brake terminal (fourth configuration).

Moreover, the first configuration further includes: a power terminal, providing a first power voltage to the control portion, the first power voltage being provided to an external micro-controller performing serial communication with the control portion; an analog switch, switching connection/disconnection of a path from the power terminal to a control terminal of the low-side transistor; and a low-side driving circuit, driving the low-side transistor.

When switching to the brake mode, the control portion turns on the analog switch and turns off the low-side driving circuit (fifth configuration).

Moreover, the fifth configuration may further include a dedicated external terminal receiving a brake signal from the exterior, that is, a brake terminal, and the control portion switches to the brake mode based on the brake signal inputted through the brake terminal (sixth configuration).

Moreover, in the fifth configuration, the control portion may receive an instruction by the serial communication for switching to the brake mode (seventh configuration).

Moreover, the first configuration may further include: a power voltage terminal, applying a second power voltage to the high-side transistor; a brake terminal serving as a dedicated external terminal, receiving a brake signal from the exterior; a driving signal generating portion, generating, according to the second power voltage, a control terminal driving signal applied to a control terminal of the low-side transistor; and a low-side driving circuit, driving the low-side transistor.

When the brake signal providing an instruction for switching to the brake mode is inputted to the brake terminal, the driving signal generating portion generates the control terminal driving signal for turning on the low-side transistor, and the control portion turns off the low-side driving circuit (eighth configuration).

Moreover, in the eighth configuration, the driving signal generating portion may include: a first resistor, having one terminal connected to the power voltage terminal; a first transistor, connected to the other terminal of the first resistor and an application terminal of a ground potential, having a control terminal thereof driven by the brake signal; an inverter section, including an input terminal connected to a first connecting node which is connected to the other terminal of the first resistor and the first transistor; a second transistor, connected between the power voltage terminal and one terminal of a second resistor, having a control terminal thereof driven by an output of the inverter section; and a Zener diode, including a cathode connected to the other terminal of the second resistor.

Wherein a second connecting node connected to the other terminal of the second resistor and the cathode is connected to the control terminal of the low-side transistor (ninth configuration).

According to another embodiment of the present invention, a motor driving system includes the motor driver of any one of the configurations; and an in-vehicle motor, driven by the motor driver (tenth configuration).

Moreover, in the tenth configuration, the in-vehicle motor is preferably a motor driving any one of a window, a vehicle seat, a seatbelt, a reflecting mirror and a windshield wiper.

Effect of the Invention

The motor driver according to the present invention is capable of suppressing power consumption in a brake state of a motor.

BRIEF DESCRIPTION OF THE DRAWINGS

FIG. 3 shows various signals for serial interface communication;

FIG. 4 shows various types of data stored in an input data register of a control logic portion;

FIG. 5 shows various types of data stored in an output data register of a control logic portion;

DETAILED DESCRIPTION OF THE EMBODIMENTS

An embodiment of the present invention is described with reference to the accompanying drawings below. Herein, an in-vehicle purpose is given as an example; however, the present invention is not limited to said purpose.

1. Motor Driving System

Figure 1:
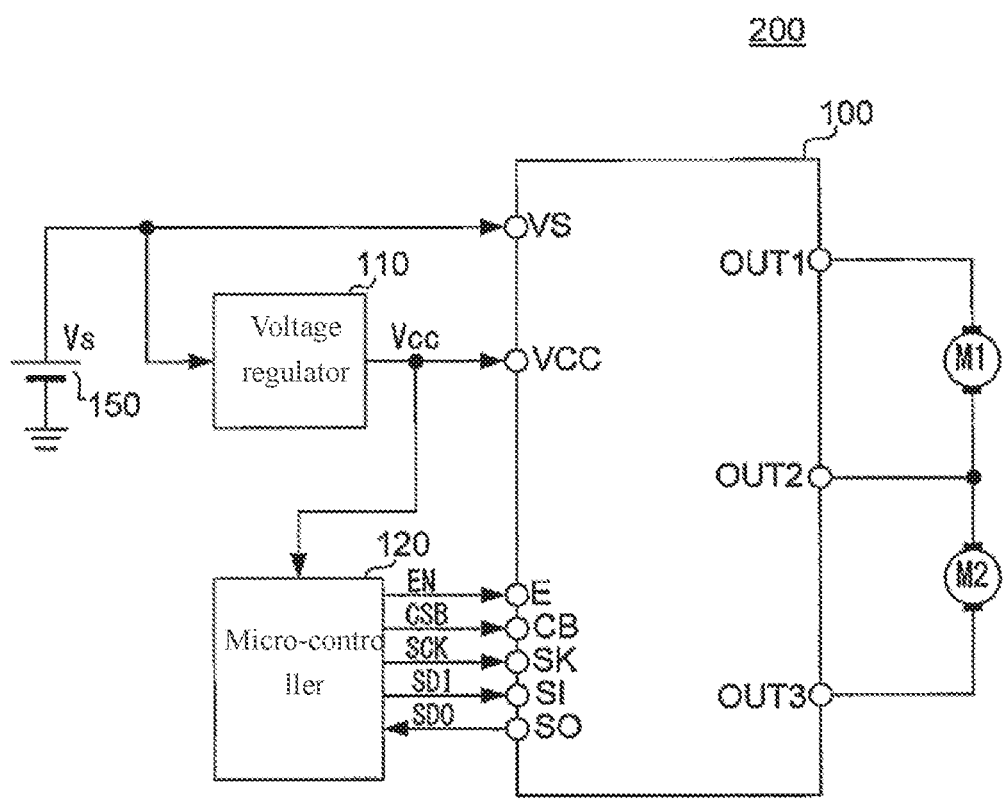
FIG. 1 is a diagram of a configuration of a motor driving system according to an exemplary embodiment of the present invention.

FIG. 1 shows a diagram of a configuration of a motor driving system according to an exemplary embodiment of the present invention. A motor driving system 200 in FIG. 1 includes a motor driver 100 constituted by a semiconductor integrated circuit device, a voltage regulator 110, a micro-controller 120, and motors M1 and M2. The motor driver 100, the voltage regulator 110 and the micro-controller 120 are included in an ECU (electronic control unit).

The motor driver 100 includes a power voltage terminal VS, a power terminal VCC, an enable terminal E, a chip select terminal CB, a clock signal input terminal SK, an input data terminal SI, an output data terminal SO, and output terminals OUT1 to OUT3 as terminals for electrical connection with the exterior.

A second power voltage Vs serving as a DC voltage is applied from a battery power source 150 to the power voltage terminal VS. The second power voltage Vs is, for example, 12V. The voltage regulator 110 converts the second power voltage Vs to a first power voltage Vcc serving as a DC voltage. The first power voltage Vcc is a voltage lower than the second power voltage Vs, and is, for example, 5 V or 3.3 V. The first power voltage Vcc is applied to the power terminal VCC, and is provided to the micro-controller 120.

The micro-controller 120 communicates with the motor driver 100 through the enable terminal E, the chip select terminal CB, the clock signal input terminal SK, the input data terminal SI, and the output data terminal SO. This situation is described below, and in particular, the motor driver 100 is, as including the chip select terminal CB, the clock signal input terminal SK, the input data terminal SI and the output data terminal SO, capable of communicating by means of serial communication which is referred to as an SPI (serial peripheral interface).

The motors M1 and M2 are DC brush motors. The motor M1 is connected between the output terminals OUT1 and OUT2. The motor M2 is connected between the output terminals OUT2 and OUT3. The motor driver 100 is capable of driving the motors M1 and M2 by outputs from the output terminals OUT1 to OUT3.

2. First Embodiment

Figure 2:
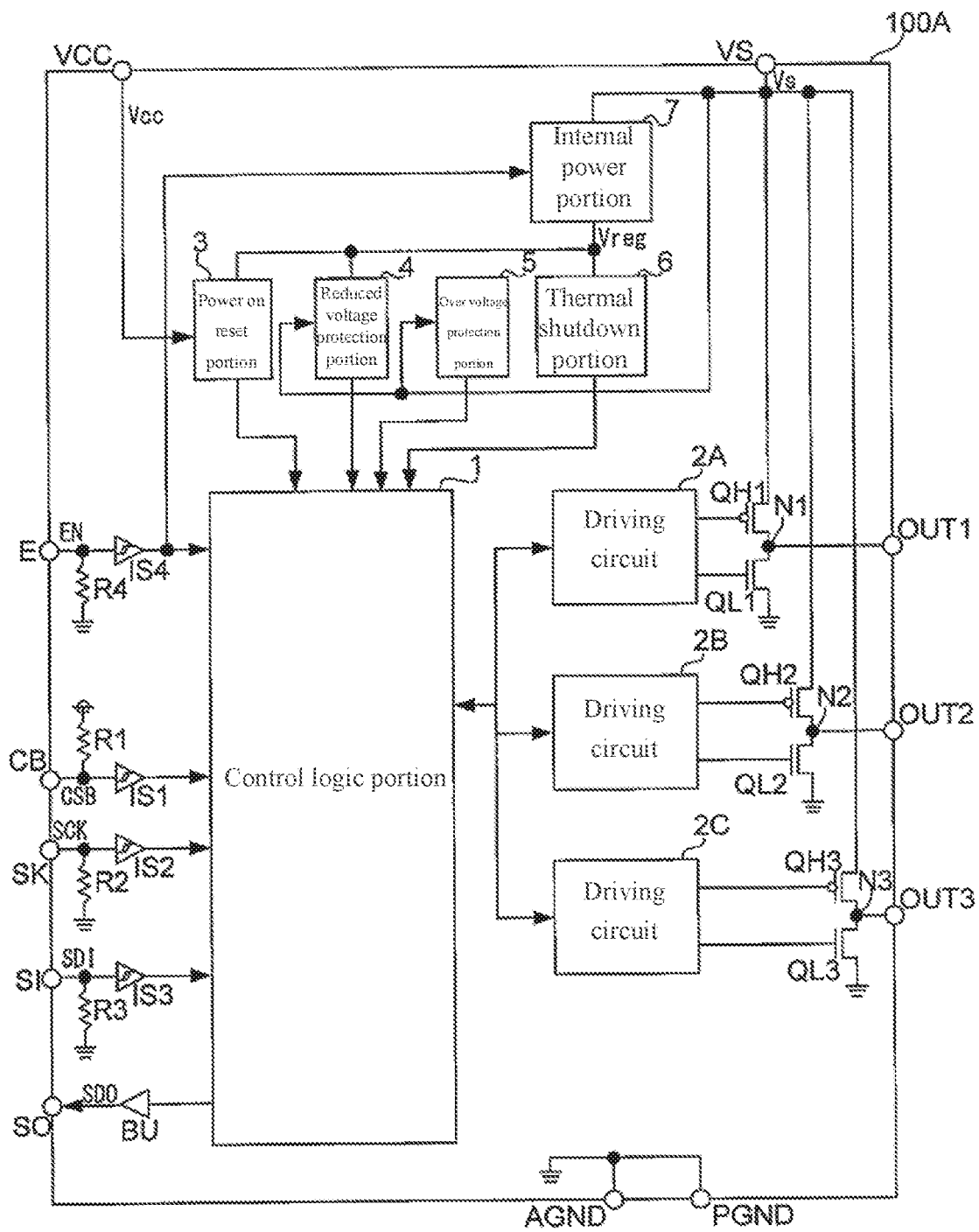
FIG. 2 is a diagram of a configuration of a motor driver according to a first embodiment.

A first embodiment in which the motor driver 100 is included in the motor driving system 200 is described below. FIG. 2 shows a diagram of a configuration of a motor driver 100A according to the first embodiment.

The motor driver 100A includes high-side transistors QH1 to QH3 and low-side transistors QL1 to QL3 constituting half-bridge power output sections. The high-side transistor QH1 and the low-side transistor QL1 form a pair and constitute one half-bridge power output section. Similarly, the high-side transistor QH2 and the low-side transistor QL2, and the high-side transistor QH3 and the low-side transistor QL3 respectively form pairs, and respectively constitute half-bridge power output sections. Such configuration includes three half-bridge power output sections, and is thus also referred to as a three-channel half-bridge driver.

Herein, as an example, the high-side transistors QH1 to QH3 are formed by, for example but not limited to, p-channel MOS (metal oxide semiconductor) transistors, and the low-side transistors QL1 to QL3 are formed by n-channel MOS transistors. For example, the high-side transistors QH1 to QH3 and the low-side transistors QL1 to QL3 may also be formed by n-channel MOS transistors. Furthermore, for example, the high-side transistors QH1 to QH3 and the low-side transistors QL1 to QL3 may also be formed by NPN bipolar transistors or by PNP bipolar transistors, instead of being formed by MOS transistors.

Three output terminals, that is, output terminals OUT1 to OUT3, are prepared in the motor driver 100A. The output terminals OUT1 to OUT3 are connected to connecting nodes N1 to N3, and the connecting nodes N1 to N3 are connected to the high-side transistors and the low-side transistors of the half-bridge power output sections, respectively.

As shown in FIG. 1, the motor M1 is connected between the output terminal OUT1 and the output terminal OUT2, and the motor M2 is connected between the output terminal OUT2 and the output terminal OUT3. That is to say, a motor is connected between one half-bridge power output section and another half-bridge power output section, and the motor is driven by a full-bridge power output section (also referred to as an H-bridge power output section). It is commonly known that, switching of forward and reverse rotations and brake of the motor are made easy when the motor is driven by a full-bridge power output section.

Driving circuits 2A to 2C are respectively connected to input sides of the half-bridge power output sections, that is, gates of the high-side transistors QH1 to QH3 and the low-side transistors QL1 to QL3. Furthermore, the power voltage terminal VS applied with the second power voltage Vs is connected to sources of the high-side transistors QH1 to QH3, and an application terminal of a ground potential is connected to sources of the low-side transistors QL1 to QL3.

In the half-bridge power output section including the high-side transistor QH1 and the low-side transistor QL1, if the high-side transistor QH1 is turned on and the low-side transistor QL1 is turned off using the driving circuit 2A, the output terminal OUT1 becomes high output; if the high-side transistor QH1 is turned off and the low-side transistor QL1 is turned on using the driving circuit 2A, the output terminal OUT1 becomes low output; if the high-side transistor QH1 is turned off and the low-side transistor QL1 is turned off using the driving circuit 2A, the output terminal OUT1 becomes high impedance (Hi-Z). The same applies to the half-bridge power output section including the high-side transistor QH2 and the low-side transistor QL2, and the half-bridge power output section including the high-side transistor QH3 and the low-side transistor QL3, and the output terminals OUT2 and OUT3 may output any one of high output, low output and high impedance.

One feature of the motor driver 100A is performing driving control of the high-side transistors QH1 to QH3 and the low-side transistors QL1 to QL3 using serial interface communication. Serial interface communication is a serial communication means that synchronizes with a clock signal while data is being transmitted. A control logic portion 1 functions as a slave device in the serial interface communication of the present invention, and is built in the motor driver 100A, and the chip select terminal CB, the clock signal input terminal SK, the input data terminal SI, and output data terminal SO are prepared as its external terminals. The micro-controller 120 functioning as a master device is connected to the four external terminals (FIG. 1), and the micro-controller 120 sends a clock signal SCK, a chip select signal CSB and input data SDI to the control logic portion 1, and receives output data SDO from the control logic portion 1. Furthermore, the serial interface communication used in the present invention, commonly known as SPI, is relatively often used in vehicles and the like in a communication means.

The chip select signal CSB, which is equivalent to an address signal designated from the master device, is inputted to the chip select terminal CB. The chip select signal CSB in a low-level period inputted to the chip select terminal CS enables SPI communication. Therefore, the protocol of SPI communication is so-called negative logic execution. The chip select terminal CB is connected to the power terminal VCC through a resistor R1 built in the motor driver 100A. The resistor R1 is referred to as a so-called pull-up resistor which keeps the chip select terminal CB at a voltage level of the power terminal VCC. According to this configuration, execution of SPI communication is stopped when the chip select signal CSB inputted from the micro-controller 120 is not yet inputted, so as to keep the level of the chip select terminal CB at a high level.

Apart from being connected to the resistor R1, the chip select terminal CB is further connected to a Schmitt buffer IS1. The Schmitt buffer IS1 is an inverter having different thresholds and hence so-called delay as a result of rising and falling of the chip select signal CSB, preventing malfunction caused by noise mixed into the signal inputted to the chip select terminal CB.

The clock signal SCK for SPI communication is inputted to the clock signal input terminal SK. In a period in which a negative signal (low-level signal) is inputted to the chip select terminal CB and the clock signal SCK is also inputted, SPI communication may be performed. A resistor R2 and a Schmitt buffer IS2 are connected to the clock signal input terminal SK. The resistor R2 is referred to as a so-called pull-down resistor, and is kept at a low level in a period in which the clock signal SCK is not inputted to the clock signal input terminal SK. The Schmitt buffer IS2 is used for a purpose identical to that of the Schmitt buffer IS1, that is, preventing malfunction of SPI communication caused by unexpected noise entering the clock signal input terminal SK.

Input data SDI is inputted from the micro-controller 120 to the input data terminal SI. The input data SDI and the clock signal SCK inputted to the clock signal input terminal SK are determined with one-to-one correspondence. For example, assuming that the control logic portion 1 includes a 16-bit register, 16 types of input data SDI may be set. A resistor R3 and a Schmitt buffer IS3 are connected to the input data terminal SI. The resistor R3 is referred to as a so-called pull-down resistor. In a period in which an input signal is not inputted to the input data terminal SI, the input data terminal SI is kept at a low level. The Schmitt buffer IS3 is prepared for a purpose identical to that of the Schmitt buffers IS1 and IS2, that is, preventing malfunction of SPI communication caused by unexpected noise entering the input data terminal SI.

The output data SDO is outputted from the output data terminal SO to the micro-controller 120. For example, assuming that the control logic portion 1 includes a 16-bit register, 16 types of output data SDO may be outputted. The control logic portion 1 and the output data terminal SO are connected by a buffer BU to suppress interference generated between the two.

The enable terminal E is used, for example, turning off the motor driver 100A. An enable signal EN is applied to the enable terminal E. The enable terminal E is connected to a resistor R4 and is further connected to a Schmitt buffer IS4. The reason for providing the Schmitt buffer IS4 is prepared for a purpose identical to that of the Schmitt buffers IS1 to IS3, that is, preventing malfunction of the overall motor driver 100A caused by unexpected noise entering the enable terminal E.

The motor driver 100A further includes a power on reset portion 3, a reduced voltage protection portion 4, an over voltage protection portion 5, a thermal shutdown portion 6, and an internal power portion 7. The internal power portion 7 converts the second power voltage Vs applied to the power voltage terminal VS to an internal voltage Vreg in a specified voltage. The internal voltage Vreg is provided to the power on reset portion 150, the reduced voltage protection portion 4, the over voltage protection portion 5 and the thermal shutdown portion 6.

The power on reset portion 3 stops providing voltage to the control logic portion 1 when the first power voltage Vcc provided to the control logic portion 1 is lower than a specified value. For example, when the first power voltage Vcc becomes 3.8 V while a usual application range of the first power voltage Vcc is 4.5 V to 5.5 V, it is considered that circuit functions of the control logic portion 1 cannot be fully ensured, and the supply of the power voltage is thus terminated.

The reduced voltage protection portion 4 keeps all of the output terminals OUT1 to OUT3 at high impedance (Hi-Z) when the second power voltage Vs provided to the power voltage terminal VS is lower than a specified value. For example, when the second power voltage Vs becomes, for example, 4.6 V or lower, while an application range of the second power voltage Vs is 8 V to 36 V, all of the high-side transistors QH1 to QH3 and the low-side transistors QL1 to QL3 are turned off, so as to keep all of the output terminals OUT1 to OUT3 at high-impedance (Hi-Z). Furthermore, the reduced voltage protection portion 4 may resume automatically, that is, again resuming the output to return to normal operation when the power voltage becomes 5.1 V or higher. Alternatively, the reduced voltage protection portion 4 may be locked and does not resume automatically.

The over voltage protection portion 5 keeps all of the output terminals OUT1 to OUT3 at high impedance (Hi-Z) when the second power voltage Vs provided to the power terminal VS is higher than a specified value. For example, when the second power voltage Vs becomes, for example, 50 V or higher, while an application range of the second power voltage Vs is usually 8 V to 36 V, all of the high-side transistors QH1 to QH3 and the low-side transistors QL1 to QL3 are turned off, so as to keep all of the output terminals OUT1 to OUT3 at high-impedance (Hi-Z). Furthermore, the over voltage protection portion 5 may resume automatically, that is, again resuming the output to return to normal operation when the power voltage becomes 45 V or lower. Alternatively, the over voltage protection portion 5 may be locked and does not resume automatically.

The thermal shutdown portion 6 keeps all of the output terminals OUT1 to OUT3 at high impedance (Hi-Z) when the junction temperature of the motor driver 100A becomes, for example, 175° C. or higher. The Hi-Z state is formed by turning off all of the high-side transistors QH1 to QH3 and the low-side transistors QL1 to QL3. Furthermore, the thermal shutdown portion 6 may also resume automatically, for example, resuming the output to return to normal operation when the junction temperature drops from 175° C. and becomes, for example, 150° C. or lower. Alternatively, the thermal shutdown portion 6 may also be locked and does not resume automatically.

Apart from the external terminals described above, the motor driver 100A further includes ground terminals AGND and PGND, and these ground terminals are electrically commonly connected by internal wires of the motor driver 100A.

FIG. 3 shows various signals of the control logic portion 1 and the micro-controller 120 for serial interface communication. In serial interface communication, the control logic portion 1 functions as a slave device and the micro-controller 120 functions as a master device. FIG. 3 shows signal waveforms of one type of SPI communication frequently used for an in-vehicle communication network in serial interface communication. The chip select signal CSB, the clock signal SCK and the input data SDI are unidirectionally inputted from the micro-controller 120 to the control logic portion 1. The output data SDO is unidirectionally inputted from the control logic potion 1 to the micro-controller 120. The chip select signal CSB is provided to specify to which component reading is to be performed or from which component writing is to be performed when the micro-controller 120 is connected to multiple chips (components). As such, the chip select signal CSB may be referred to as an address signal indicating that the micro-controller 120 has specified the control logic portion 1. In the connotation that a master device has specified a signal of a slave device, the chip select signal CSB may also be referred to as a slave device select signal. The control logic portion 1 allows SPI communication in a low-level period of the chip select signal CSB.

The clock signal SCK is provided from the micro-controller 120 through the clock signal input terminal SK to the control logic portion 1. The clock signal SCK generates a specified pulse number in a low-level period of the chip select signal CSB. For example, assuming that the control logic portion 1 includes a 16-bit serial interface, there are 16 clock signals SCK in the low-level period of the chip select signal CSB, and it is determined that a transmission error has occurred if the pulse number of the clock signal SCK is other than 16. In addition, when 24-bit and 32-bit interfaces are set, the pulse numbers of the clock signal SCK are 24 and 32, respectively, and it is determined that a transmission error has occurred if the pulse number of the clock signal SCK is other than these pulse numbers. If it is determined that a transmission error has occurred, the outputs of all of the output terminals OUT1 to OUT3 are set to high impedance (Hi-Z).

The input data SDI is provided from the micro-controller 120 through the input data terminal SI to the control logic portion 1. The pulse of the input data SDI is generated in synchronization with the pulse of the clock signal SCK, and the pulse numbers of both are the same. When FIG. 3 is observed from the obverse side, a most significant bit MSB is on the leftmost side, and the clock signal SCK is sequentially shifted by one bit toward the right side to finally reach the least significant bit LSB. When the control logic portion 16 is in a 16-bit serial interface configuration, 16 sets of SPI input data may be prepared. The input data SDI is stored in an input data register built in the control logic portion 1. 16 sets of specific input data SDI stored in an input data register according to an embodiment of the present invention are to be described in detail below.

The output data SDO is transmitted from the control logic portion 1 through the output data terminal SO to the micro-controller 120. The output data SDO is in synchronization with the clock signal SCK and the input data SDI. The output data SDO is stored in an output data register built in the control logic portion 1. In the output data SDO, a part indicated by the sign X represents a part with an undetermined state, that is, a part with whether a high level or a low level is not yet determined. Furthermore, 16 sets of specific output data SDO stored in an output data register according to an embodiment of the present invention are to be described in detail below.

FIG. 4 shows various types of data stored in the input data register when the control logic portion 1 is in a 16-bit serial interface configuration. Observing FIG. 4 from the obverse side, the bit number is shown on the left side from the top to the bottom. The top corresponds to a most significant bit MSB, and is represented by a bit number 15.

A symbol SRR is assigned to the bit number 15, that is, the most significant bit MSB, with function of resetting the input data register, and a normal state is set when low-level ("0") is selected as the bit status, and the various types of data stored in the input data register are reset when high-level ("1") is selected as the bit status.

A symbol HSC1 is assigned to the bit number 14 for setting a turn-on and turn-off status of the high-side transistor QH1. The high-side transistor QH1 is set to be turned on or turned off when the status of the bit number 14 is "0" or "1".

A symbol LSC1 is assigned to the bit number 13 for setting a turn-on and turn-off state of the low-side transistor QL1. The low-side transistor QL1 is set to be turned on or turned off when the status of the bit number 13 is "0" or "1".

A symbol HSC2 is assigned to the bit number 12 for setting a turn-on and turn-off state of the high-side transistor QH2. The high-side transistor QH2 is set to be turned on or turned off when the status of the bit number 12 is "0" or "1".

A symbol LSC2 is assigned to the bit number 11 for setting a turn-on and turn-off state of the low-side transistor QL2. The low-side transistor QL2 is set to be turned on or turned off when the status of the bit number 11 is "0" or "1".

A symbol HSC3 is assigned to the bit number 10 for setting a turn-on and turn-off state of the high-side transistor QH3. The high-side transistor QH3 is set to be turned on or turned off when the status of the bit number 10 is "0" or "1".

A symbol LSC3 is assigned to the bit number 9 for setting a turn-on and turn-off state of the low-side transistor QL3. The low-side transistor QL3 is set to be turned on or turned off when the status of the bit number 9 is "0" or "1".

The bit numbers 8 to 4 in FIG. 4 are not used.

A symbol UNDER LOAD is assigned to the bit number 3 for setting turning-on and turning-off of a load open-circuit detection function. The load open-circuit detection function is set to be turned on or turned off when the status of the bit number 3 is "0" or "1".

A symbol TSDSTH is assigned to the bit number 2 for setting the condition of the thermal shutdown portion 6. A lock state is selected when the status of the bit number 2 is set to "0", and automatic resume is selected when set to "1".

A symbol PSSTH is assigned to the bit number 1 for setting a protection state of the reduced voltage protection portion 4 and the over voltage protection portion 5. A lock state is selected when the status of the bit number 1 is set to "0", and automatic resume is selected when set to "1".

A symbol RESERVE is assigned to the bit number 0 for reserve.

By observing the bit numbers 14 and 13 in the input data register shown in FIG. 4, when the both bit statuses are set to "1", the high-side transistor QH1 and the low-side transistor QL1 are simultaneously turned on. If the two transistors operate under such condition, large currents will flow into the two transistors, which may cause undesirable situations such as degradation or damage. Therefore, in one embodiment of the present invention, when setting a condition such as simultaneously turning on the two transistors, the control logic portion 1 changes the logic status so as to turn off any one of the two transistors, and in particular, changing the status by setting the high-side transistor QH1 to be turned off and the low-side transistor QL1 to be turned on.

The foregoing status change is similarly set for the bit numbers 12 and 11 and the bit numbers 10 and 9. That is to say, the control logic portion 1 is configured to prevent a state in which the high-side transistor and the low-side transistor forming the half-bridge power output section from being turned on simultaneously.

FIG. 5 shows data stored in the output data register when the control logic portion 1 is in a 16-bit serial interface configuration. Observing FIG. 5 from the obverse side, bit numbers are shown on the left side from the top to the bottom. The top corresponds to a most significant bit MSB and is represented by a bit number 15.

A symbol OCDS is assigned to the bit number 15, that is, the most significant bit MSB, for representing a detection status of an overcurrent protection portion. The overcurrent protection portion is built in each of the driving circuits 2A to 2C. It is determined that overcurrent has occurred when a current of, for example, 1.5 A, flows into each of the output terminals OUT1 to OUT3, and the output terminal with detected overcurrent is locked at high impedance (Hi-Z). The bit status is low level ("0") when no overcurrent is detected, and is high level ("1") when overcurrent is detected.

A symbol HSS1 is assigned to the bit number 14 for representing the turn-on or turn-off state of the high-side transistor QH1. The high-side transistor QH1 is turned off or turned on when the bit status of the bit number 14 is "0" or "1".

A symbol LSS1 is assigned to the bit number 13 for representing the turn-on or turn-off state of the low-side transistor QL1. The low-side transistor QL1 is turned off or turned on when the bit status of the bit number 13 is "0" or "1".

A symbol HSS2 is assigned to the bit number 12 for representing the turn-on or turn-off state of the high-side transistor QH2. The high-side transistor QH2 is turned off or turned on when the bit status of the bit number 12 is "0" or "1".

A symbol LSS2 is assigned to the bit number 11 for representing the turn-on or turn-off state of the low-side transistor QL2. The low-side transistor QL1 is turned off or turned on when the bit status of the bit number 11 is "0" or "1".

A symbol HSS3 is assigned to the bit number 10 for representing the turn-on or turn-off state of the high-side transistor QH3. The high-side transistor QH3 is turned off or turned on when the bit status of the bit number 10 is "0" or "1".

A symbol LSS3 is assigned to the bit number 9 for representing the turn-on or turn-off state of the low-side transistor QL3. The low-side transistor QL3 is turned off or turned on when the bit status of the bit number 9 is "0" or "1".

The bit numbers 8 to 4 in FIG. 5 are not used.

A symbol UNDER LOADS is assigned to the bit number 3 for representing a detection status of a load open-circuit detection function, which is a normal state when the bit status of the bit number 3 is "0" and is in a malfunction state when the bit status of the bit number 3 is "1".

A symbol TSDS is assigned to the bit number 2 for representing the state of the thermal shutdown portion 6, which is in a normal state when the bit status of the bit number 2 is "0", that is, low-level, and is in a malfunction state when the bit status of the bit number 2 is "1", that is, high-level, and is kept in a locked state.

A symbol OVPS is assigned to the bit number 1 for representing the state of the over voltage protection portion 5, which is in a normal state when the bit status of the bit number 1 is "0", that is, low-level, and is in a malfunction state when the bit status of the bit number 1 is "1", that is, high-level, and is kept in a locked state.

A symbol UVLOS is assigned to the bit number 0 (LSB) for representing the state of the reduced voltage protection portion 4, which is in a normal state when the bit status of the bit number 0 is "0", that is, low-level, and is in a malfunction state when the bit status of the bit number 0 is "1", that is, high-level, and is kept in a locked state.

Next, the operation of the motor driver 100A in a brake mode of this embodiment is described below.

In this embodiment, the control logic portion 1 of the motor driver 100A switches to a brake mode upon receiving a brake mode instruction from the micro-controller 120 by means of SPI communication. More specifically, any one of the unused bit numbers 4 to 8 in the input data SDI in FIG. 4 may be used for a brake mode instruction, or the reserved bit number 0 may also be used for a brake mode instruction.

Alternatively, in the input data SDI in FIG. 4, the high-side transistor may be set to be turned off with respect to the bit number 14, the low-side transistor may be set to be turned on with respect to the bit number 13, the high-side transistor may be set to be turned off with respect to the bit number 12, the low-side transistor may be set to be turned on with respect to the bit number 11, the high-side transistor may be set to be turned off with respect to the bit number 10, and the low-side transistor may be set to be turned on with respect to the bit number 9, accordingly giving an instruction for switching to the brake mode.

When the control logic portion 1 switches to the brake mode, the following operation is performed. Herein, FIG. 6 shows a diagram of a configuration example of a driving circuit 2A for driving a half-bridge power output section including the high-side transistor QH1 and the low-side transistor QL1.

Figure 6:
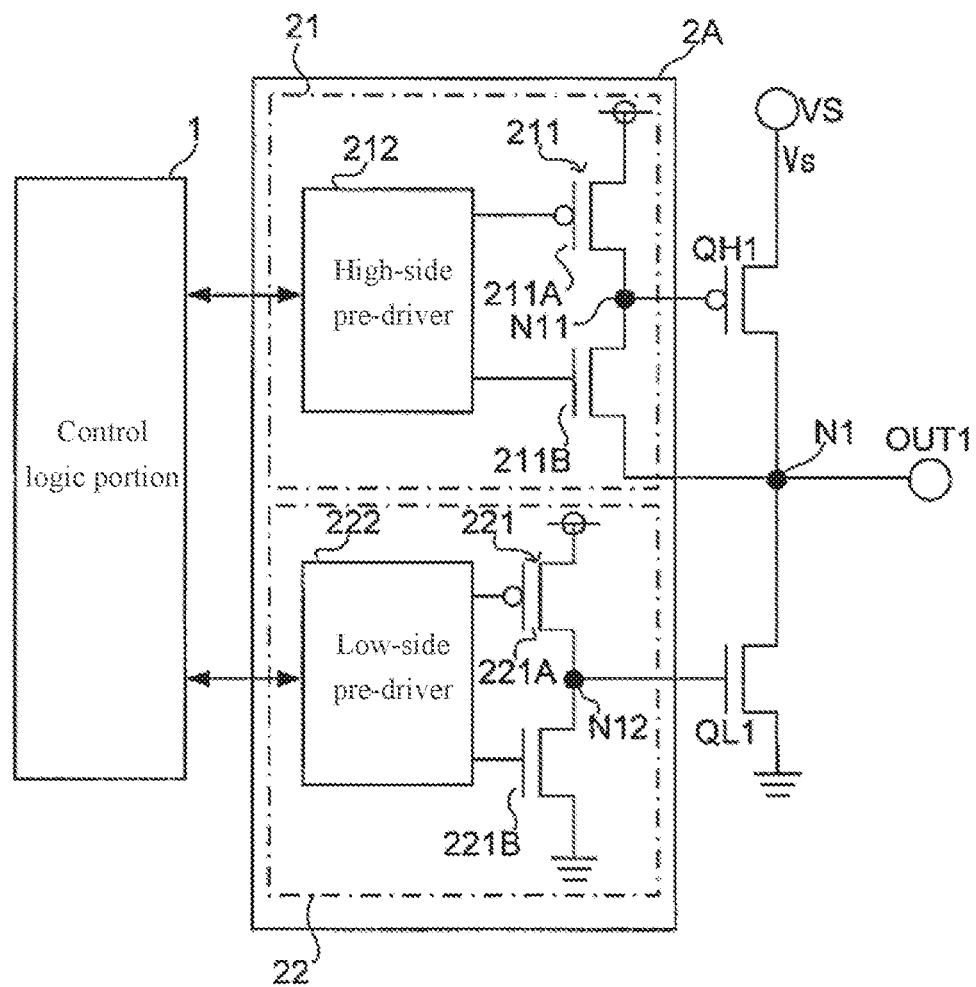
FIG. 6 is a diagram of a configuration example of a driving circuit driving a half-bridge power output section.

As shown in FIG. 6, the driving circuit 2A includes a high-side driving circuit 21 and a low-side driving circuit 22.

The high-side driving circuit 21 includes a high-side driver 211 and a high-side pre-driver 212. The high-side driver 211 includes a high-side transistor 211A including a p-channel MOS transistor, and a low-side transistor 211B including an n-channel MOS transistor.

The source of the high-side transistor 211 is connected to an application terminal of the power voltage. The drain of the high-side transistor 211A is connected to a connecting node N11 and is accordingly connected to the drain of the low-side transistor 211B. The connecting node N11 is connected to the gate of the high-side transistor QH1. The source of the low-side transistor 211B is connected to the connecting node N1. The high-side pre-driver 212 drives the high-side transistor 211A and the low-side transistor 211B.

If the high-side pre-driver 212 is in an operating state (active state), based on the instruction from the control logic portion 1, the high-side pre-driver 212 turns on the high-side transistor 211A and turns off the low-side transistor 211B to accordingly turn off the high-side transistor QH1, and turns off the high-side transistor 211A and turns on the low-side transistor 211B to accordingly turn on the high-side transistor QH1.

On the other hand, the low-side driving circuit 22 includes a low-side driver 221 and a low-side pre-driver 222. The low-side driver 221 includes a high-side transistor 221A including a p-channel MOS transistor, and a low-side transistor 221B including an n-channel MOS transistor.

The source of the high-side transistor 221A is connected to an application terminal of the power voltage. The drain of the high-side transistor 221A is connected to a connecting node N12 and is accordingly connected to the drain of the low-side transistor 221B. The connecting node N12 is connected to the gate of the low-side transistor QL1. The source of the low-side transistor 221B is connected to an application terminal of a ground potential. The low-side pre-driver 222 drives the high-side transistor 221A and the low-side transistor 221B.

If the low-side pre-driver 222 is in an operating state (active state), based on an instruction from the control logic portion 1, the low-side pre-driver 222 turns on the high-side transistor 221A and turns off the low-side transistor 221B to accordingly turn on the low-side transistor QL1, and turns off the high-side transistor 221A and turns on the low-side transistor 221B to accordingly turn off the low-side transistor QL1.

Herein, as previously described, when switching to the brake mode, the control logic portion 1 turns off the high-side pre-driver 212 such that the low-side pre-driver 222 in an operating state turns on the low-side transistor QL1. Thus, the high-side transistor 211A and the low-side transistor 211B both become turned off, and the connecting node N11 becomes an open-circuit state, such that the high-side transistor QH1 is set to be turned off. On the other hand, the high-side transistor 221A is set to be turned on and the low-side transistor 221B is set to be turned off by the low-side pre-driver 222, such that the low-side transistor QL1 is set to be turned on.

Furthermore, driving circuits 2B and 2C (FIG. 2) are in configurations identical to that of the driving circuit 2A shown in FIG. 6. When switching to the brake mode, the respective high-side pre-drivers in the driving circuits 2B and 2C are turned off, and the low-side transistors QL2 and QL3 are set to be turned on using the respective low-side pre-drivers.

Thus, the motors M1 and M2 (FIG. 1) become a short brake state. As such, in this embodiment, when switching to the brake mode, the high-side pre-driver (high-side driving circuit) driving the high-side transistor is turned off, and so consumption of electric current may be reduced.

Particularly, if the motors M1 and M2 are set as in-vehicle motors for driving a power window, a power seat, a seatbelt, a side view mirror and a windshield wiper, the power-saving effect becomes more significant when the motors M1 and M2 are mostly in a halt state (brake state) during the operation of the vehicle, hence prolonging a driving range of the vehicle is expected.

3. Variation Example of the First Embodiment

Figure 7:
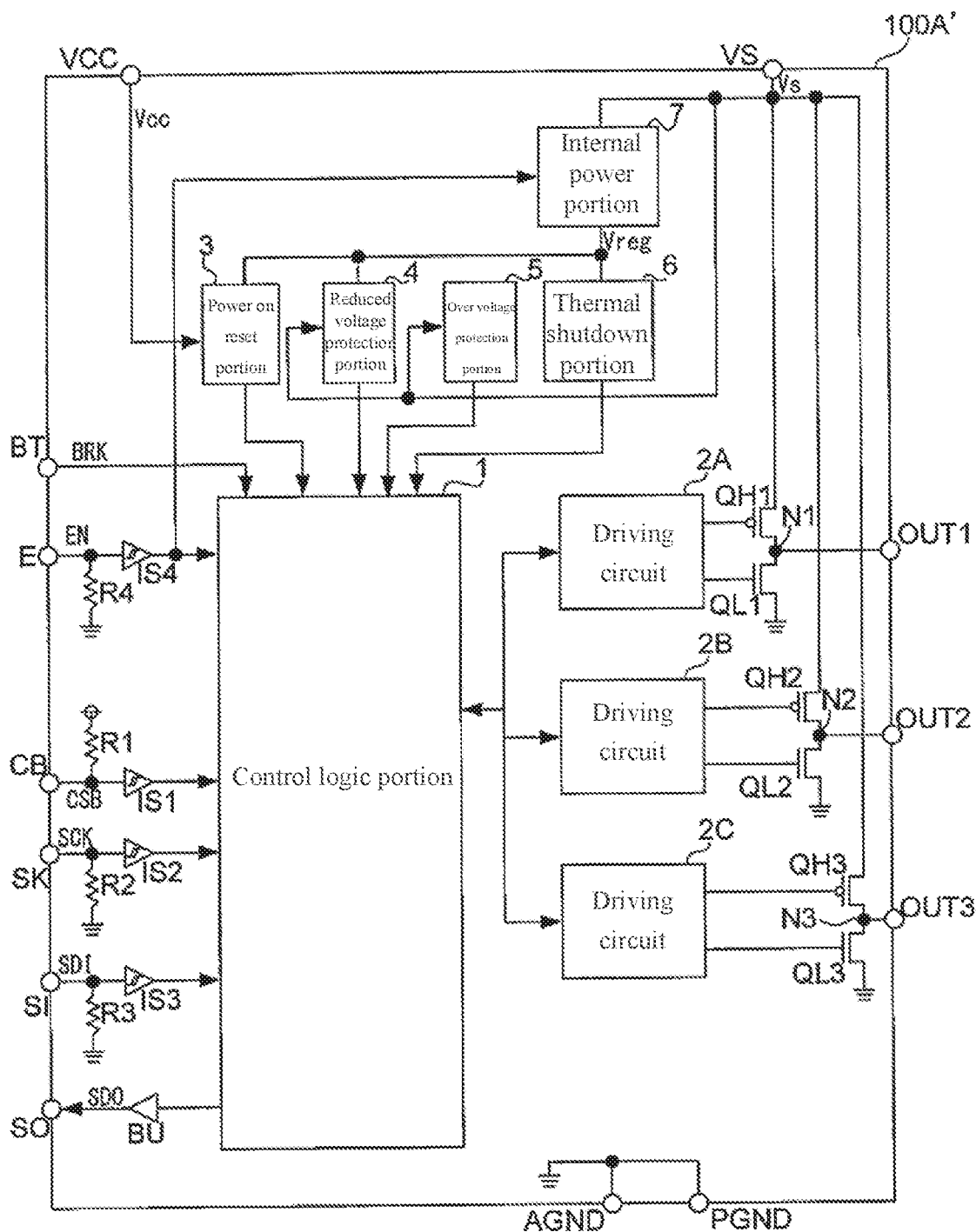
FIG. 7 is a diagram of a configuration of a motor driver according to a variation example of the first embodiment.

FIG. 7 is a diagram of a configuration of a motor driver 100A' according to a variation example of the first embodiment. The motor driver 100A' in FIG. 7 differs from the configuration in FIG. 2 by a brake terminal BT further provided.

A brake signal BRK is inputted from the micro-controller 120 (FIG. 1) to the brake terminal BT serving as an external terminal, and the brake signal BRK is inputted to the control logic portion 1. For example, when the brake signal BRK is at a high-level, the control logic portion 1 switches to a brake mode. That is to say, in this embodiment, the motor driver is made to switch to the brake mode using a dedicated external terminal, instead of by performing SPI communication.

4. Second Embodiment

Figure 8:
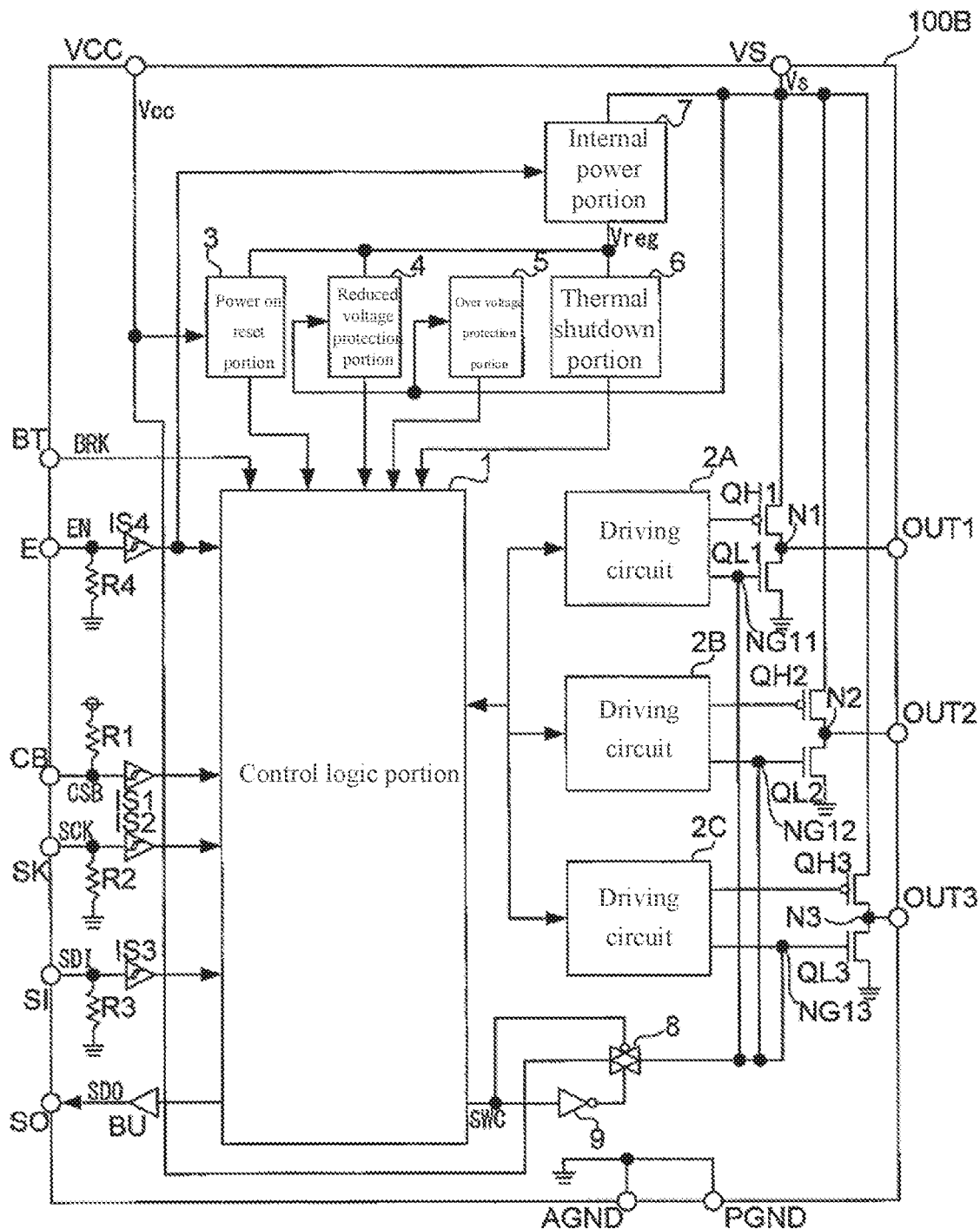
FIG. 8 is a diagram of a configuration of a motor driver according to a second embodiment.

Next, a second embodiment of the present invention is described below. FIG. 8 shows a diagram of a configuration of a motor driver 100B according to a second embodiment. The motor driver 100B in FIG. 8 differs from the configuration of the first embodiment (FIG. 2) by a brake terminal BT, an analog switch 8 and an inverter 9 further provided. Furthermore, the brake terminal BT is identical to that in the variation example (FIG. 7) of the first embodiment.

As shown in FIG. 8, in order to perform SPI communication in this embodiment, similar to the micro-controller 120 (FIG. 1), the first power voltage Vcc is provided to the control logic portion 1, and therefore it is effective when the power terminal VCC is provided.

The analog switch 8 is configured on a path from the power terminal VCC to the connecting node NG11 connected to the gate of the low-side transistor QL1, the connecting node NG12 connected to the gate of the low-side transistor QL2 and the connecting node NG13 connected to the gate of the low-side transistor QL3, and switches connection/disconnection of the path.

The control logic portion 1 inputs a switch control signal SWC to a first input terminal of the analog switch 8, and inputs the switch control signal SWC to a second input terminal of the analog switch 8 through the inverter 9. Thus, the control logic portion 1 switches turning-on/turning-off of the analog switch 8 by switching high level/low level of the switch control signal SWC. When the analog switch 8 is turned on, the first power voltage Vcc is applied to the connecting nodes NG11, NG12 and NG13 through the analog switch 8, that is, the gates of the low-side transistors QL1, QL2 and QL3, and the low-side transistors QL1, QL2 and QL3 are set to be turned on.

Figure 9:
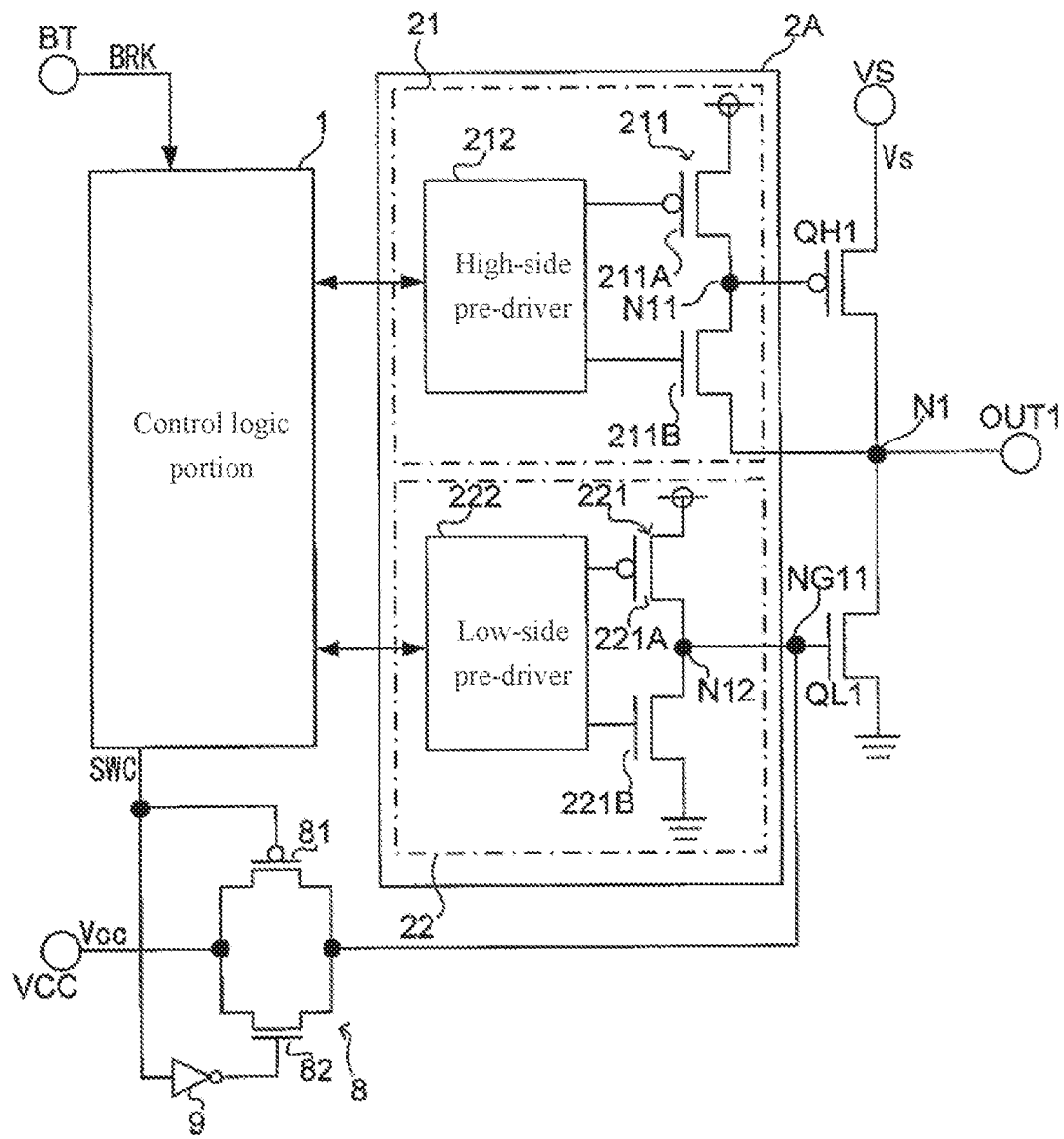
FIG. 9 is a diagram of a specific configuration example of an analog switch according to the second embodiment.

FIG. 9 shows a diagram of a specific configuration example of the analog switch 8 in FIG. 8, and a configuration example of the driving circuit 2A driving the half-bridge power output section including the high-side switch QH1 and the low-side switch QL1. Furthermore, the configuration of the driving circuit 2A is identical to that shown in FIG. 6.

As shown in FIG. 9, the analog switch 8 has a parallel connection configuration including a p-channel MOS transistor 81 and an n-channel MOS transistor 82.

When the control logic portion 1 switches to the brake mode by the brake signal BRK inputted to the control logic portion 1 through the brake terminal BT, the control logic portion 1 turns on the analog switch 8 by setting the switch control signal SWC to low-level, and the first power voltage Vcc is applied to the connecting node NG II, that is, the gate of the low-side transistor QL1, through the analog switch 8. At this point in time, the control logic portion 1 turns off both the high-side pre-driver 212 and the low-side pre-driver 222, and so the connecting nodes N11 and N12 become an open-circuit state. Accordingly, the high-side transistor QH1 is set to be turned off, and the low-side transistor QL1 is set to be turned on.

Furthermore, the driving circuits 2B and 2C (FIG. 8) have configurations identical to that of the driving circuit 2A in FIG. 9. When switching to the brake mode, the respective high-side pre-drivers and the respective low-side pre-drivers in the driving circuits 2B and 2C are turned off. In addition, the first power voltage Vcc is applied to the connecting nodes NG12 and NG13 by the analog switch 8 which has been turned on. Accordingly, the high-side transistors QH2 and QH3 are set to be turned off, and the low-side transistors QL2 and QL3 are set to be turned on.

Accordingly, the motors M1 and M2 become a short brake state. As such, in this embodiment, when switching to the brake mode, the high-side pre-driver (high-side driving circuit) and the low-side pre-driver (low-side driving circuit) are turned off, and so consumption of electric current is reduced. Moreover, the use of the analog switch 8 is also helpful to reduce electric power.

Furthermore, in this embodiment, a variation example of switching to the brake mode may also be implemented by SPI communication instead of the brake terminal BT provided.

5. Third Embodiment

Figure 10:
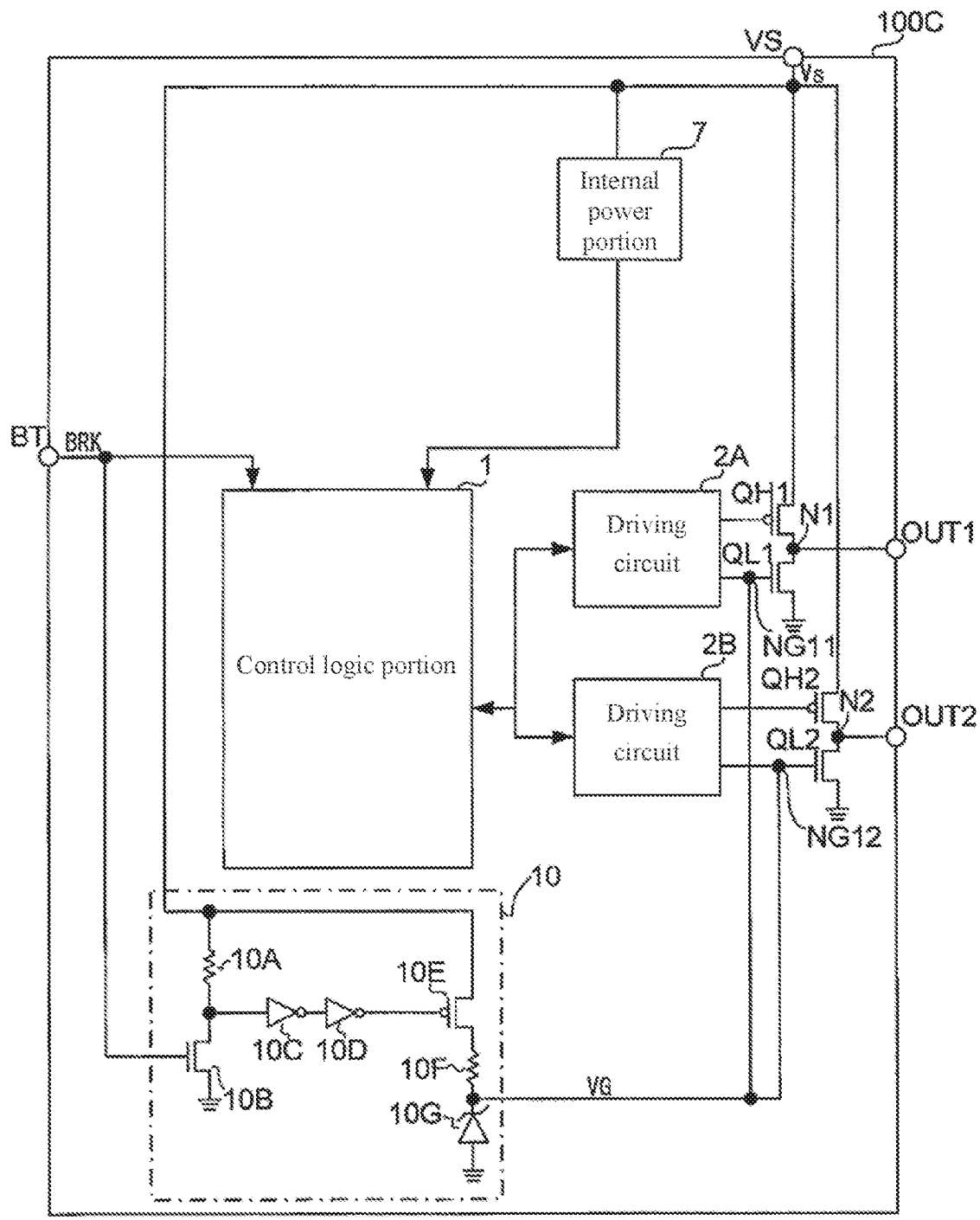
FIG. 10 is a diagram of a configuration of a motor driver according to a third embodiment.

A third embodiment of the present invention is described below. FIG. 10 shows a diagram of a configuration of a motor driver 100C according to a third embodiment of the present invention.

In the motor driver 100C in FIG. 10, the control logic portion 1 does not have an SPI communication function and thus does not include the power terminal VCC for providing the first power voltage Vcc to the control logic portion 1. Accordingly, in the motor driver 100C, the second power voltage Vs applied to the power voltage terminal VS is converted by the internal power portion 7 and then provided to the control logic portion 1. Furthermore, the motor driver 100C includes the brake terminal BT.

Furthermore, the motor driver 100C is provided with a gate voltage generating portion (driving signal generating portion) 10. The gate voltage generating portion 10 generates a gate voltage (control terminal driving signal) VG according to the second power voltage Vs applied to the power voltage terminal VS, and applies the generated gate voltage VG to the connecting nodes NG11 and NG12, that is, the gates of the low-side transistors QL1 and QL2. Moreover, the gate voltage generating portion 10 switches turning-on and turning-off of the gate voltage VG according to the brake signal BRK.

Figure 11:
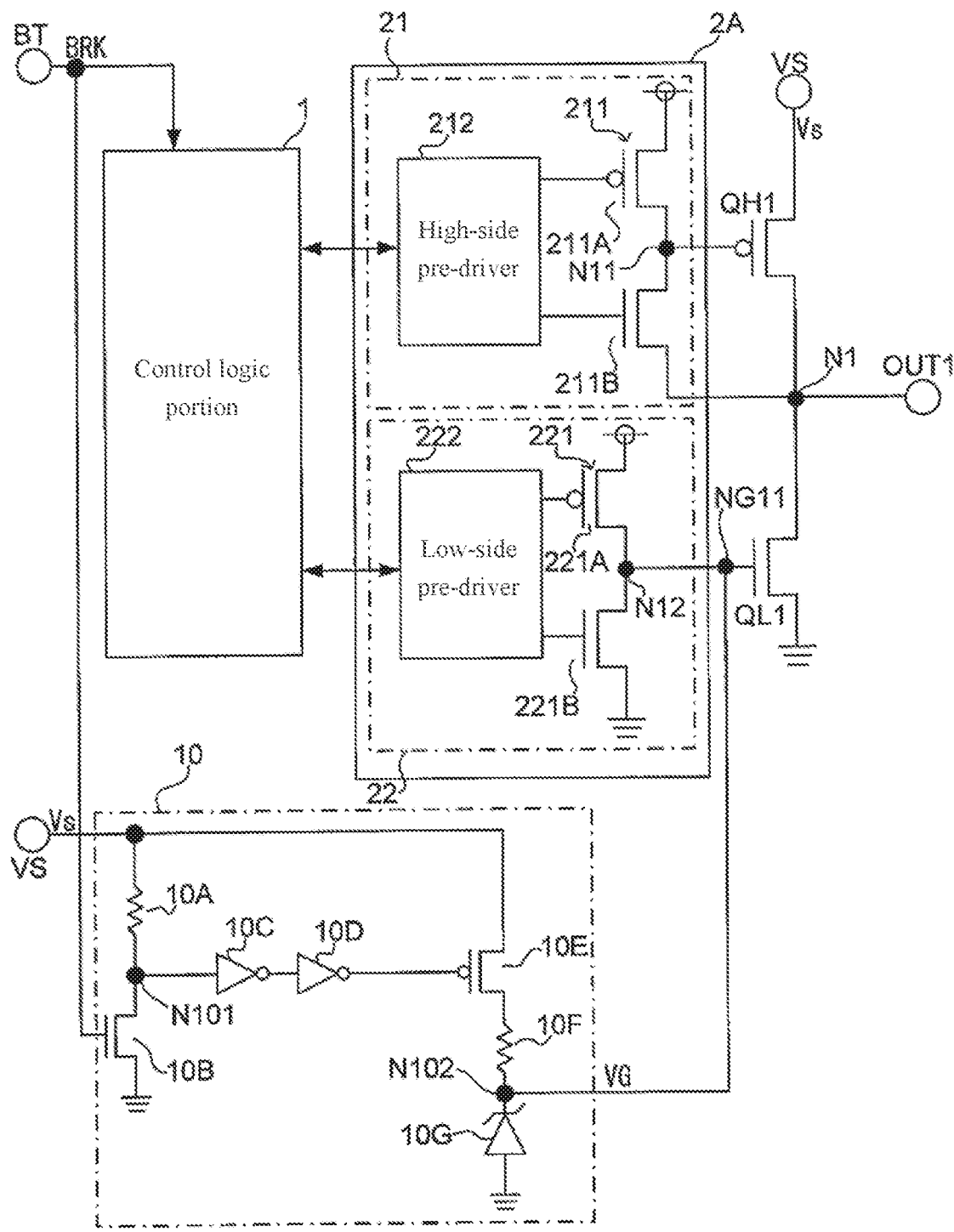
FIG. 11 is a diagram of a configuration example of a gate voltage generating portion according to the third embodiment.

FIG. 11 shows a diagram of a configuration example of the gate voltage generating portion 10 in FIG. 10, and a configuration example of the driving circuit 2A driving the half-bridge power output section including the high-side switch QH1 and the low-side switch QL1. Moreover, the configuration of the driving circuit 2A is the same with that in FIG. 6.

As shown in FIG. 11, the gate voltage generating portion 10 includes a pull-up resistor 10A, an nMOS 10B including an n-channel MOS transistor, inverters 10C and 10C, a pMOS 10E including a p-channel MOS transistor, a resistor 10F, and a Zener diode 10G.

One terminal of the pull-up resistor 10A is connected to the power voltage terminal VS, and the other terminal of the pull-up resistor 10A is connected to the drain of the nMOS 10B through a connecting node N101. The source of the nMOS 10B is connected to an application terminal of a ground potential. The connecting node N101 is connected to an input terminal of the inverter 10C. An output terminal of the inverter 10C is connected to an input terminal of the inverter 10D. An output terminal of the inverter 10D is connected to the gate of the pMOS 10E. The source of the pMOS 10E is connected to the power voltage terminal VS. The drain of the pMOS 10E is connected to one terminal of the resistor 10F, and the other terminal of the resistor 10F is connected to the cathode of the Zener diode 10G through a connecting node N102. The anode of the Zener diode 10G is connected to an application terminal of the ground potential. The connecting node N102 is connected to the gate of the low-side transistor QL1 through the connecting node NG11.

When the brake signal BRK indicates a brake mode turned off state by a low level, the nMOS 10B is turned off, the input of the inverter 10C becomes high-level, the output of the inverter 10D becomes high-level, and the pMOS 10E is turned off. Accordingly, the gate voltage VG is dependent on the turn-on/turn-off states of the high-side switch 221A and the low-side switch 221B.

On the other hand, when the brake signal BRK is high-level and the brake mode is turned on, the nMOS 10B is turned on, the input of the inverter 10C becomes low-level, the output of the inverter 10D becomes low-level, and the pMOS 10E is turned on. At this point in time, the control logic portion 1 receives the brake signal BRK and becomes high-level, such that the high-side pre-driver 212 and the low-side pre-driver 222 are both turned off, and the connecting nodes N11 and N12 become an open-circuit state. Accordingly, the high-side transistor QH1 is turned off. Furthermore, the gate voltage VG is clamped at a Zener voltage by the Zener diode 10G since the pMOS 10E is turned on, the low-side transistor QL1 is turned on. Furthermore, the resistor 10F functions as a current limiting resistor.

In addition, the driving circuit 2B (FIG. 10) has a configuration identical to that of the driving circuit 2A in FIG.

11. When switching to the brake mode, the high-side pre-driver and the low-side pre-driver in the driving circuit 2B are turned off. Moreover, the gate voltage VG clamped at the Zener voltage is applied to the connecting node NG12. Accordingly, the high-side transistor QH2 is set to be turned off and the low-side transistor QL2 is set to be turned on.

Thus, a motor (not shown) connected between the output terminals OUT1 and OUT2 becomes a short brake state. As such, in this embodiment, when switching to the brake mode, the high-side pre-driver (high-side driving circuit) and the low-side pre-driver (low-side driving circuit) are turned off, and so consumption of electric current is reduced. In addition, consumption of electric current flowing in the pull-up resistor 10A and the resistor 10F in the gate voltage generating portion 10 is also reduced.

6. Adaptation Example of an In-Vehicle System

The motor drivers of the embodiments described above may be adapted to various in-vehicle systems. Herein, a motor driver adapted to a power window system as an example of an in-vehicle system is described below.

Figure 12:
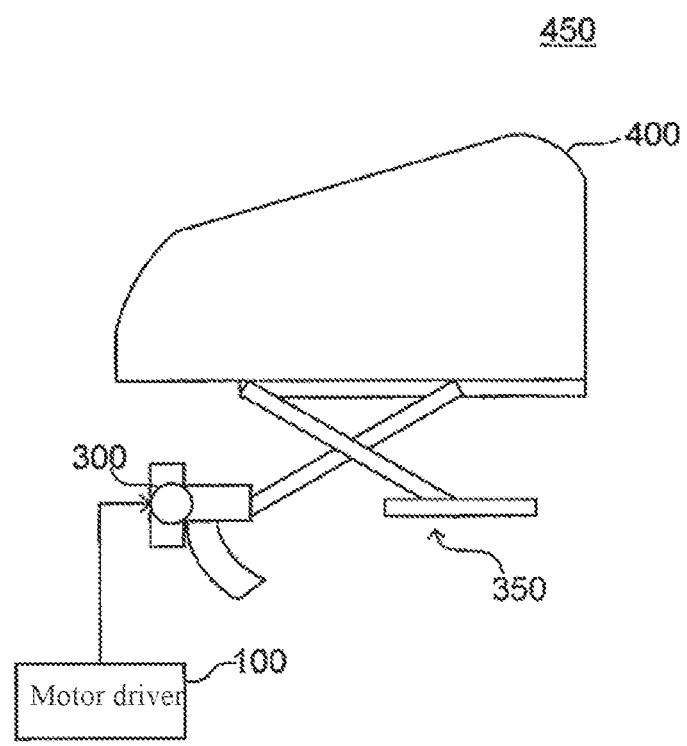
FIG. 12 is a brief diagram of a configuration example of a power window system adapted to the motor driver according to an embodiment of the present invention.

FIG. 12 shows a brief diagram of a configuration example of a power window system 450 adapted to the motor driver 100 according to an embodiment of the present invention. The power window system 450 in FIG. 12 is a system for driving a window 400, and includes the motor driver 100, a motor 300, a regulator 350 and the window 400.

The motor driver 100 performs driving control on the motor 300 serving as a DC brush motor. The regulator 350 is a so-called arm-type regulator, and is a mechanism that moves the window 400 up and down by rotation of the motor 300. Moreover, the regulator is not limited to the above example, and may be, for example, a wire harness regulator. The window 400 is configured, for example, in the front or back of two side surfaces of a vehicle.

With rotation driving of the motor 300 performed by the motor driver 100, once the position in the up-down direction of the window 400 is adjusted, the motor driver 100 switches to the brake mode, and the motor 300 becomes a short brake state to fix the position of the window 400. Thus, as the motor driver 100 is mostly in the brake mode during travel of the vehicle, the power-saving effect achieved by the various embodiments may be increased. Further, as described above, in-vehicle systems adapted to the present invention further include, for example, power seat systems, seatbelt systems, side-view mirror systems and windshield wiper systems.

7. Other

The embodiments of the present invention are described as above; however, variations may be made to the embodiments without departing from the scope of the subject matter of the present invention.

INDUSTRIAL APPLICABILITY

The present invention may be used for purposes such as driving an in-vehicle motor.

What is claimed is:

1. A motor driver, comprising:
a half-bridge power output section, including a high-side transistor and a low-side transistor;
a low-side driving circuit operable to drive the low-side transistor;
a high-side driving circuit operable to drive the high-side transistor;
a control portion;
a driving signal generating portion, different from the high-side driving circuit and the low-side driving circuit of the motor driver, operable to transmit a control terminal driving signal to a control terminal of the low-side transistor; and
a brake terminal, being a dedicated external terminal, operable to receive a brake signal operable to provide an instruction for switching to the brake mode;
wherein when switching to a brake mode, the low-side transistor is turned on and the control portion turns off the high-side driving circuit, and
wherein when the brake signal is inputted to the brake terminal, the driving signal generating portion is operable to generate the control terminal driving signal for turning on the low-side transistor, and the control portion is operable to turn off the low-side driving circuit.

2. The motor driver according to claim 1, wherein the control portion is operable to control, when switching to the brake mode, the low-side driving circuit in an operating state to turn on the low-side transistor.

3. The motor driver according to claim 2, wherein the control portion is operable to receive an instruction by serial communication for switching to the brake mode.

4. The motor driver according to claim 2,
wherein the brake terminal is operable to receive the brake signal from an exterior; and
wherein the control portion is operable to switch to the brake mode based on the brake signal inputted through the brake terminal.

5. The motor driver according to claim 1, further comprising:
a power terminal, operable to provide a first power voltage to the control portion, the first power voltage being provided to an external micro-controller performing serial communication with the control portion; and
an analog switch, is operable to switch connection/disconnection of a path from the power terminal to a control terminal of the low-side transistor;
wherein the control portion, when switching to the brake mode, is operable to turn on the analog switch and turns off the low-side driving circuit.

6. The motor driver according to claim 5,
wherein the brake terminal is operable to receive the brake signal from an exterior; and
wherein the control portion is operable to switch to the brake mode based on the brake signal inputted through the brake terminal.

7. The motor driver according to claim 5, wherein the control portion is operable to receive an instruction by the serial communication for switching to the brake mode.

8. The motor driver according to claim 1, further comprising:
a power voltage terminal, is operable to apply a second power voltage to the high-side transistor,
wherein the control terminal driving signal is generated according to the second power voltage.

9. The motor driver according to claim 8, wherein the driving signal generating portion comprises:
a first resistor, having one terminal thereof connected to the power voltage terminal;

a first transistor, connected between the other terminal of the first resistor and an application terminal of a ground potential, having a control terminal thereof driven by the brake signal;

an inverter section, comprising an input terminal connected to a first connecting node, the first connecting node connected to the other terminal of the first resistor and the first transistor;

a second transistor, connected between the power voltage terminal and one terminal of a second resistor, having a control terminal thereof driven by an output of the inverter section; and a Zener diode, comprising a cathode connected to the other terminal of the second resistor;

wherein a second connecting node connected to the other terminal of the second resistor and the cathode is connected to the control terminal of the low-side transistor.

10. A motor driving system, comprising:
the motor driver according to claim 1; and
an in-vehicle motor, operable to be driven by the motor driver.

11. A motor driving system, comprising:
the motor driver according to claim 2; and
an in-vehicle motor, operable to be driven by the motor driver.

12. A motor driving system, comprising:
the motor driver according to claim 3; and
an in-vehicle motor, operable to be driven by the motor driver.

13. A motor driving system, comprising:
the motor driver according to claim 4; and
an in-vehicle motor, operable to be driven by the motor driver.

14. A motor driving system, comprising:
the motor driver according to claim 5; and
an in-vehicle motor, operable to be driven by the motor driver.

15. A motor driving system, comprising:
the motor driver according to claim 6; and
an in-vehicle motor, operable to be driven by the motor driver.

16. A motor driving system, comprising:
the motor driver according to claim 7; and
an in-vehicle motor, operable to be driven by the motor driver.

17. A motor driving system, comprising:
the motor driver according to claim 8; and
an in-vehicle motor, operable to be driven by the motor driver.

18. A motor driving system, comprising:
the motor driver according to claim 9; and
an in-vehicle motor, operable to be driven by the motor driver.

19. The motor driving system according to claim 10, wherein the in-vehicle motor is a motor operable to drive any one of a window, a vehicle seat, a seatbelt, a reflecting mirror and a windshield wiper.

* * * * *